(12) United States Patent
Worrall et al.

(10) Patent No.: US 7,518,057 B2
(45) Date of Patent: *Apr. 14, 2009

(54) METHOD OF AUTOMATED MUSICAL INSTRUMENT FINGER FINDING

(76) Inventors: Richard William Worrall, 12289 Ragweed St., San Diego, CA (US) 92129; Robert William Sharp, 17769 Frondoso Dr., San Diego, CA (US) 92128

( * ) Notice: Subject to any disclaimer, the term of this patent is extended or adjusted under 35 U.S.C. 154(b) by 0 days.

This patent is subject to a terminal disclaimer.

(21) Appl. No.: 12/077,145

(22) Filed: Mar. 17, 2008

(65) Prior Publication Data

US 2008/0216639 A1  Sep. 11, 2008

Related U.S. Application Data

(63) Continuation of application No. 11/809,577, filed on Jun. 1, 2007, now Pat. No. 7,345,236, which is a continuation-in-part of application No. 10/766,633, filed on Jan. 27, 2004, now Pat. No. 7,238,876.

(60) Provisional application No. 60/444,413, filed on Feb. 3, 2003.

(51) Int. Cl.
 *G10H 1/18* (2006.01)
 *G09B 15/00* (2006.01)

(52) U.S. Cl. ............... 84/722; 84/470 R; 84/477 R; 84/485 R; 434/350

(58) Field of Classification Search ............ 84/722, 84/477 R, 485 R, 470 R; 434/350
See application file for complete search history.

(56) References Cited

U.S. PATENT DOCUMENTS

| | | | | |
|---|---|---|---|---|
| 3,153,970 A | * | 10/1964 | Mulchi | 84/485 R |
| 3,767,833 A | * | 10/1973 | Noble et al. | 84/673 |
| 3,937,118 A | * | 2/1976 | Leonard | 84/471 SR |
| 4,295,406 A | * | 10/1981 | Smith | 84/470 R |
| 4,412,473 A | * | 11/1983 | Laflamme | 84/485 R |
| 4,671,159 A | * | 6/1987 | Stark | 84/485 R |
| 4,885,969 A | * | 12/1989 | Chesters | 84/615 |
| 4,966,052 A | * | 10/1990 | Shiraki et al. | 84/715 |
| 5,040,447 A | * | 8/1991 | Murata et al. | 84/612 |
| 5,396,828 A | * | 3/1995 | Farrand | 84/462 |
| 5,408,914 A | * | 4/1995 | Breitweiser et al. | 84/477 R |
| 5,533,903 A | * | 7/1996 | Kennedy | 434/307 R |

(Continued)

OTHER PUBLICATIONS

Izumi, T. "Cognitively oriented design of a multimedia system to learn guitar fingering", Proc. International Conf. Computers in Education, 202, p. 789.

(Continued)

*Primary Examiner*—Jeffrey Donels
*Assistant Examiner*—Christina Russell
(74) *Attorney, Agent, or Firm*—John Karl Buche

(57) ABSTRACT

An automated computing system and method for determining fingering of musical instruments from digitized scored music or tablature. The computerized automated finger finder system and method analyzes a musical composition and determines hand and/or fingering positional information such that the musical composition can be efficiently played on a musical instrument of choice with minimal hand movement. The method and computing system also provide alternate or secondary fingering choices such that the musician can play with a different tonal stylization or with greater or lesser ease depending on his skill level.

16 Claims, 8 Drawing Sheets

U.S. PATENT DOCUMENTS

| | | | | |
|---|---|---|---|---|
| 5,639,977 | A * | 6/1997 | Hesnan | 84/477 R |
| 5,690,496 | A * | 11/1997 | Kennedy | 434/307 R |
| 5,866,832 | A * | 2/1999 | Solowiow | 84/485 R |
| 5,907,115 | A * | 5/1999 | Matsunaga et al. | 84/477 R |
| 6,025,551 | A | 2/2000 | Munekawa et al. | |
| 6,080,925 | A * | 6/2000 | Rogers et al. | 84/485 R |
| 6,107,557 | A * | 8/2000 | Fukada | 84/485 R |
| 6,162,981 | A * | 12/2000 | Newcomer et al. | 84/485 R |
| 6,201,174 | B1 * | 3/2001 | Eller | 84/477 R |
| 6,281,422 | B1 * | 8/2001 | Kawamura | 84/615 |
| 6,331,668 | B1 * | 12/2001 | Michero | 84/477 R |
| 6,355,181 | B1 * | 3/2002 | McQuarrie | 216/2 |
| 6,388,181 | B2 * | 5/2002 | Moe | 84/477 R |
| 6,410,839 | B2 | 6/2002 | Okubo et al. | |
| 6,452,081 | B1 * | 9/2002 | Ravagni et al. | 84/477 R |
| 6,486,387 | B1 * | 11/2002 | Munekawa et al. | 84/477 R |
| 6,486,388 | B2 * | 11/2002 | Akahori | 84/478 |
| 6,542,081 | B2 * | 4/2003 | Torch | 340/575 |
| 6,703,549 | B1 * | 3/2004 | Nishimoto et al. | 84/609 |
| 6,751,439 | B2 | 6/2004 | Tice et al. | |
| 6,881,883 | B2 * | 4/2005 | Harrison | 84/317 |
| 7,098,392 | B2 | 8/2006 | Sitrick et al. | |
| 7,202,408 | B2 * | 4/2007 | Fallgatter | 84/645 |
| 7,238,876 | B1 * | 7/2007 | Worrall et al. | 84/722 |
| 7,345,236 | B2 * | 3/2008 | Worrall et al. | 84/722 |
| 2001/0003944 | A1 * | 6/2001 | Okubo et al. | 84/637 |
| 2003/0110925 | A1 * | 6/2003 | Sitrick et al. | 84/477 R |

OTHER PUBLICATIONS

Burns, A.-M. and Wanderley, M.M., "Computer vision method for guitarist fingering retrieval", Proc. of the 2006 Sound and Music Computing Conference, May 2006, p. 1-7.

Tuohy, D.R. and Potter, W.D., "GA-based music arranging for guitar", IEEE Congress on Evolutionary Computation 2006, Jul. 16-21; p. 1065-1070.

Wang, J.-F. and Li, T-Y., "Generating guitar scores from a MIDI source", Outline of talk at Proceedings of 1997 International Symposium on Multimedia Information Processing.

* cited by examiner

METHOD OF AUTOMATED MUSICAL INSTRUMENT FINGER FINDING

CROSS-REFERENCE TO RELATED APPLICATIONS

This application is a continuation of, and claims the benefit of priority to, U.S. application Ser. No. 11/809,577, filed Jun. 1, 2007 now U.S. Pat. No. 7,345,236, now allowed; which is a continuation-in-part application of, and claims the benefit of priority to, U.S. application Ser. No. 10/766,633, filed on Jan. 27, 2004, now U.S. Pat. No. 7,238,876; which application claims the benefit of priority to U.S. provisional application Ser. No. 60/444,413, filed on Feb. 3, 2003, the disclosures of which are incorporated herein by reference in their entirety.

FIELD OF INVENTION

This invention relates to music and, in particular, a computing system and a method to enhance an instrumentalist's ability to perform musical compositions on an instrument.

BACKGROUND OF INVENTION

U.S. Pat. No. 6,201,174 to Eller (2001) discloses a computerized tablature composer that generates tablature notation from conventional staff notation. However, the disclosure of the '174 patent does not provide any teaching or suggestion as to how to generate the tablature. In addition, Eller's patent does not generate an automated fingering sequence in order to perform the musical composition efficiently.

U.S. Pat. No. 5,396,828 to Farrand (1995) discloses a means for automatically producing guitar fingerboard information for chords from staff notation. Farrand's invention analyzes the music for various instruments and produces guitar chords that fit the harmonic rhythm of the melody; it does not give the fingering positioning for the exact notes in the staff notation that a guitar would play, and it only deals with chords, not individual notes of the melody. For example, in U.S. Pat. No. 5,396,828, FIG. 14, the first measure of the music depicts a D chord in second position on the guitar fingerboard; this is not, however, how the three notes shown in the staff of the music would be played by the guitar (i.e., Farrand's chord does not depict the exact voicing of the chord from the staff notation).

U.S. Pat. No. 5,639,977 to Hesnan (1997) discloses a music learning aid that displays playing instructions associated with musical notes. However, Hesnan's invention does not give an automated means for determining optimal or secondary fingering of an instrument for a given musical piece.

Various patents (e.g., U.S. Pat. Nos. 5,533,903, 5,639,977, 5,690,496, and 6,388,181) discuss the depiction of musical instrument fingering. However, none of them provides a method for automatically determining the fingering information.

SUMMARY OF THE INVENTION

In accordance with the present invention, a computing system and a method of generating the optimal and secondary fingering for at least one given musical instrument from a musical score and/or tablature data are claimed.

In a first aspect, the invention is a method for determining the optimal fingering for a given musical instrument comprising: providing a memory which is able to store digital musical data, providing a means of inputting and storing digital musical data into said memory, calculating the optimum and alternate fingering of different musical instruments based on said digital musical input data, providing a means to output said musical instrument fingering data, whereby musical instrument fingering information is conveyed to an interested party, and whereby musical instrument fingering information can be used by an interested party to optimally perform the musical data on an instrument or publish the fingering information.

In a second aspect, the invention is a machine for determining the optimal fingering of a musical instrument, comprising: a memory which is able to store digital musical data, a musical data input means for storing digital musical data into said memory, a processor for calculating the optimum and alternate fingering of different musical instruments based on said digital musical input data, an output means for conveying said musical instrument fingering data, whereby musical instrument fingering data is conveyed to an interested party, and whereby musical instrument fingering data can be used by an interested party to optimally perform the composition on an instrument or publish the fingering data.

Embodiments of the first and second aspects of the invention include those wherein the fingering information is comprised of which finger is placed where on a selected instrument; the fingering information is comprised of tablature information; the optimum fingering is fingering such that hand movement is minimized on the instrument for the given digital musical data; the fingering is alternate and is such that it is easier to perform for the skill level of a given performer, the fingering is alternate and is such that it provides for a preferred tonal stylization for a given performer or composer, the input musical data is comprised of a musical score or tablature information; the input means is a data storage device containing digital musical data, or a computer network from which digital musical data is obtained, or a computer program where digital musical data is entered by a mouse, keyboard, or tablet, or a MIDI device providing digital musical data, or a digitizing scanner that scans paper containing musical data, or a microphone that captures musical sounds, an analog-to-digital converter that converts the sounds into digital information, and a means of converting the digital information into digital musical data; the method comprises a means of converting the scanner's digitized image into digital musical data; the output means is a data storage device, or a computer network, or a printer, or a computer monitor, or a device that uses the fingering information for a musical performance.

A third aspect of the invention is a computing system for automatically determining hand and/or fingering positioning information for performing a musical composition on a musical instrument, comprising:

a. a memory, b. an input device for inputting the musical composition into the computing system, c. a processor for automatically (i) identifying all strokes and stroke groups in the input musical composition, wherein a stroke is a note or a chord, and wherein a stroke group comprises sequential strokes of the musical composition that can be played at one positional location on the musical instrument, (ii) selecting a stroke group to be used to determine the hand and/or fingering information for each stroke, wherein each selection is based on the shortest path of hand and/or fingering movement between sequential strokes, and (iii) using the selected stroke groups to determine the hand and/or fingering positioning information for playing the strokes in the musical composition on the musical instrument, and d. an output device for outputting the hand and/or fingering positioning information for performance of the musical composition on the musical instrument.

A fourth aspect of the invention is a computing system for automatically determining hand and/or fingering positioning information for performing a musical composition on a musical instrument, comprising:

a. a memory, b. an input device for inputting the musical composition into the computing system, c. a processor for automatically (i) identifying all strokes and stroke groups in the input musical composition, wherein a stroke is a note or a chord, and wherein a stroke group comprises sequential strokes of the musical composition that can be played at one positional location on the musical instrument, (ii) selecting a stroke group to be used to determine the hand and/or fingering information for each stroke, wherein each selection is consistent with a user preference selected from the group consisting of easier fingering, minimized hand movement, ease of performance, and tonal quality, and (iii) using the selected stroke groups to determine the hand and/or fingering positioning information for playing the strokes in the musical composition on the musical instrument in the user preferred manner, and d. an output device for outputting the hand and/or fingering positioning information for performance of the musical composition on the musical instrument according to the user preference.

A fifth aspect of the invention is a method for automatically determining hand and/or fingering positional information for performing a musical composition on a musical instrument, comprising:

a. providing a computing system, b. inputting the musical composition into the computing system, c. using the computing system to automatically (i) identify all strokes and stroke groups in the input musical composition, wherein a stroke is a note or a chord, and wherein a stroke group comprises sequential strokes of the musical composition that can be played at one positional location on the musical instrument, (ii) select a stroke group to be used to determine the hand and/or fingering information for each stroke, wherein each selection is based on the shortest path of hand and/or fingering movement between sequential strokes, and (iii) use the selected stroke groups to determine the hand and/or fingering positioning information for playing the strokes in the musical composition on the musical instrument, and d. outputting the hand and/or fingering positioning information for performance of the musical composition on the musical instrument.

A sixth aspect of the invention is a computing system for automatically determining hand and/or fingering positioning information for performing a musical composition on at least one musical instrument, comprising:

a. a memory, b. an input device for inputting the musical composition into the computing system, c. a processor for automatically (i) identifying all strokes and stroke groups in the input musical composition, wherein a stroke is a note or a chord, and wherein a stroke group for each instrument comprises sequential strokes of the musical composition that can be played at one positional location on that instrument, (ii) selecting a stroke group to be used to determine the hand and/or fingering information for each stroke to be performed on each instrument, wherein each selection is based on the shortest path of hand and/or fingering movement on the instrument between sequential strokes, and (iii) using the selected stroke groups to determine the hand and/or fingering positioning information for playing the strokes in the musical composition on each musical instrument, and d. an output device for outputting the hand and/or fingering positioning information for performance of the musical composition on at least one musical instrument, wherein at least one musical instrument is selected from the group consisting of a stringed instrument, a woodwind instrument, a brass instrument, a keyboard instrument, and a percussion instrument.

A seventh aspect of the invention is a computing system for automatically determining hand and/or fingering positioning information for performing a musical composition on at least one musical instrument, comprising:

a. a memory, b. an input device for inputting the musical composition into the computing system, c. a processor for automatically (i) identifying all strokes and stroke groups in the input musical composition, wherein a stroke is a note or a chord, and wherein a stroke group for an instrument comprises sequential strokes of the musical composition that can be played at one positional location on that instrument, (ii) selecting a stroke group to be used to determine the hand and/or fingering information for each stroke to be performed on each instrument, wherein each selection is consistent with a user-selected secondary manner of performing the musical composition, and (iii) using the selected stroke groups to determine the hand and/or fingering positioning information for playing the strokes in the musical composition on each musical instrument in the user-selected secondary manner, and d. an output device for outputting the hand and/or fingering positioning information for performance of the musical composition on the at least one musical instrument according to the user selected secondary manner, wherein at least one musical instrument is selected from the group consisting of a stringed instrument, a woodwind instrument, a brass instrument, a keyboard instrument, and a percussion instrument.

An eighth aspect of the invention is a method for automatically determining hand and/or fingering positional information for performing a musical composition on at least one musical instrument, comprising:

a. providing a computing system, b. inputting the musical composition into the computing system, c. using the computing system to automatically (i) identify all strokes and stroke groups in the input musical composition, wherein a stroke is a note or a chord, and wherein a stroke group for an instrument comprises sequential strokes of the musical composition that can be played at one positional location on that instrument, (ii) select a stroke group to be used to determine the hand and/or fingering information for each stroke to be performed on each instrument, wherein all selections are either (a) based on the shortest path of hand and/or fingering movement between sequential strokes on the musical instrument, or (b) consistent with a user-selected secondary manner of performing the musical composition, and (iii) use the selected stroke groups to determine the hand and/or fingering positioning information for playing the strokes in the musical composition on each musical instrument, and d. outputting the hand and/or fingering positioning information for performance of the musical composition on the at least one musical instrument, wherein at least one musical instrument is selected from the group consisting of a stringed instrument, a woodwind instrument, a brass instrument, a keyboard instrument, and a percussion instrument.

In these first through eighth aspects of the invented computing system and method, the hand and/or fingering positioning information comprises an array of hand position information selected from the group consisting of which hand is being described, which finger is placed where on the musical instrument, and to which stroke in the musical composition the information refers. In some aspects, the musical instrument is selected from the group consisting of a stringed instrument, a woodwind instrument, a brass instrument, a keyboard instrument, and a percussion instrument, such as banjo, guitar, bass, harp, lute, mandolin, viola, violin, violoncello, bassoon, clarinet, flute, oboe, saxophone, trombone, cornet, horn, trumpet, tuba, accordion, organ, piano, drum and xylophone. In some aspects, the hand and/or fingering positioning information is for a string instrument, such as a guitar, and the hand and/or fingering positioning information indicates which finger is on which string and fret of the guitar, or for a keyboard instrument, such as a piano, and the hand and/or fingering positioning information indicates which finger of which hand is on which key of the piano.

In some embodiments of the invention, the hand and/or fingering positioning information is such that (i) hand movement is minimized on the musical instrument when performing the musical composition, (ii) hand and/or fingering positioning information is such that the musical composition is easier to perform on the instrument for the skill level of a given performer, or (iii) hand and/or fingering positioning information is such that it provides for a preferred tonal stylization for a given performer or composer, natural or artificial harmonics, and techniques that affect how a note is to played.

In certain embodiments of the invention, the input device is selected from the group consisting of a data storage device containing digital musical data, a computer network from which digital musical data are obtained, a computer program, stored on a computer readable medium, where digital musical data are entered by a mouse, keyboard, or tablet, a MIDI device providing digital musical data, a digitizing scanner that scans paper containing the musical composition and a means of converting the digitized image into digital musical data, a microphone that captures musical sounds and a converter that converts the sounds into digital musical data, and the output device is selected from the group consisting of a data storage device, a computer network, a printer, a computer monitor, and a device that uses the hand and/or fingering information for a musical performance. The computing system and method may also comprise a digitizing device for digitizing a musical composition that is input in a non-digitized form.

In one embodiment of the invented computing systems and method the input musical composition is comprised of a musical score or tablature information. Other embodiments of the invention include those wherein the hand and/or fingering positional information is provided for one musical instruments, whereas other embodiments contemplate the hand and/or fingering positional information is provided for at least two different musical instruments.

DRAWINGS—REFERENCE NUMERALS

Figure 1:
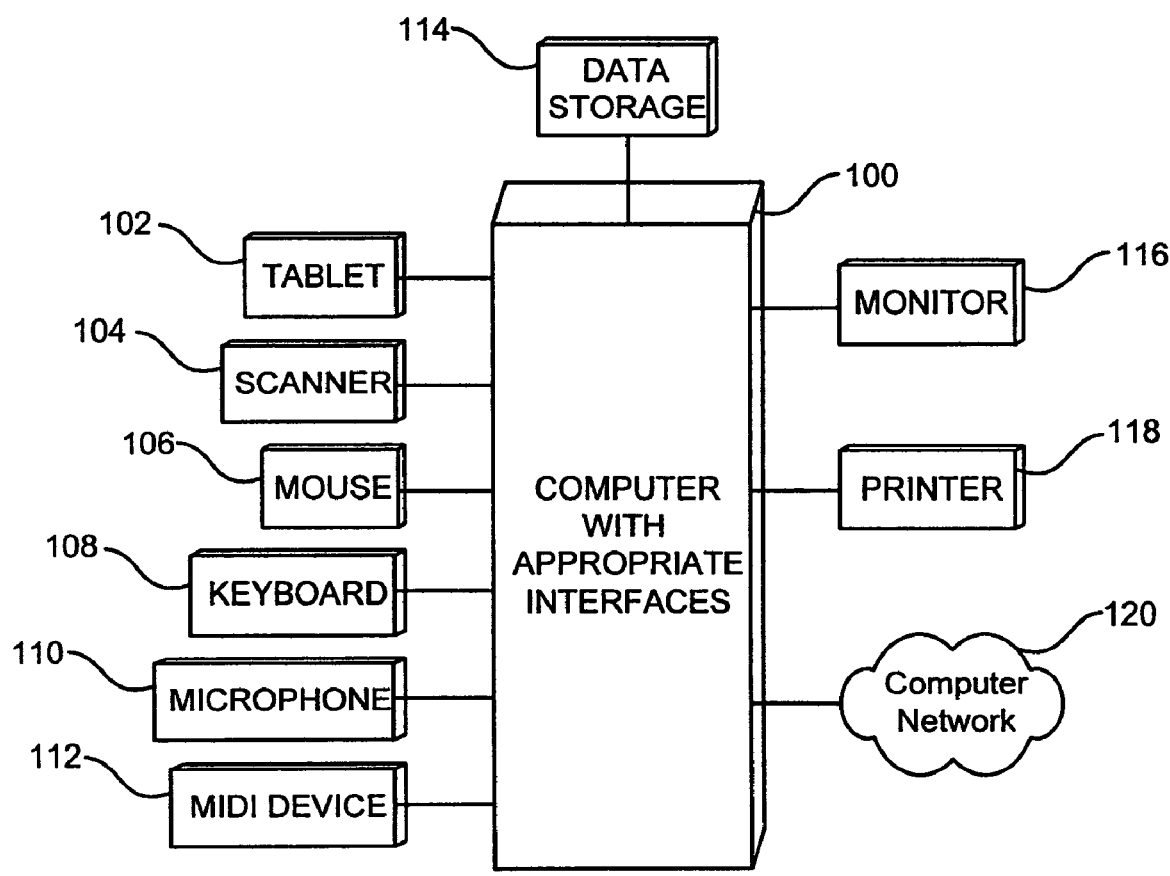
FIG. 1 illustrates an exemplary computing system for use in conjunction with an embodiment of the Finger Finder invention.

100 Computing System
102 Drawing Tablet Input
104 Scanning Input System
106 Mouse Input
108 Keyboard Input
110 Microphone Input
112 MIDI Input/Output Device
114 Secondary Storage Input/Output Device
116 Display Monitor Output
118 Printer Output
120 Computer Network
200 Instrument Position Axis
202 Time Axis
204 Stroke
206 Positional Range Group
208 Positional Range Group
210 Positional Range Group
212 Positional Range Group
214 Positional Range Group
216 Transition from group 206 to group 212
218 Transition from group 212 to group 214
220 Positional Range Group
222 Transition from group 214 to group 228
224 Transition from group 230 to group 226
226 Positional Range Group
228 Positional Range Group
230 Positional Range Group
232 Transition from group 228 to group 230
234 Transition from group 228 to group 226
236 Transition from group 226 to group 244
238 Transition from group 230 to group 242
240 Transition from group 244 to group 250
242 Positional Range Group
244 Positional Range Group
246 Positional Range Group 248 Transition from group 244 to group 246
250 Positional Range Group
252 Transition from group 242 to group 250
300 Finger Finder Routine Entry Point
302 Initialization Activities Of Positional Range Stroke Group Creation and Assignment Of Strokes To Group
304 Decision Point: Determining If Finished Creating Groups And Assigning Strokes To Groups
306 Getting Positional Range Of A Stroke
308 Initialization Activities For Transversal Of Positional Ranges Of Stroke
310 Decision Point: Determining If On Last Positional Range Of Stroke
312 Activity To Access Next Stroke
314 Decision Point: Determining If Group Already Exists For Stroke's Positional Range
316 Adding Stroke To Existing Group
318 Creating New Positional Range Stroke Group For Stroke
320 Termination Activity Of Creating New Group
322 Decision Point: Determining If There Is Only One Group Stroke Is In
324 Denoting Stroke As One That Is Only In One Group
326 Activity To Access Next Positional Range Of Stroke
328 Initialization Activities For Determining Which Positional Range Groups Are Used
330 Decision Point: Determining If Finished Determining Which Positional Range Groups Are Used
332 Decision Point: Determining If Stroke Can Only Be Played In One Group
334 Decision Point: Determining If On Last Stroke
336 Decision Point: Determining If There Was A Previous Stroke That Could Only Be Played In One Group
338 Activity To Find Used Group(s) If On Last Stroke And Last Stroke Is In Multiple Groups
340 Activity To Find Used Group(s) Upon Finding First Stroke That Could Only Be Played In One Group
342 Activity To Find Used Group(s) Upon Finding Subsequent Stroke That Could Only Be Played In One Group
344 Activity After Finding Used Group(s)
346 Activity To Access Next Stroke
348 Initialization Activity For Determining Actual Fingering
350 Decision Point: Determining If Done
352 Finding Group Stroke Is In
354 Finding Key Boundary Stroke
356 Determining Hand Position On Instrument For Group
358 Determining Fingering Positions For Strokes In Group
360 Marking Group As Unused Once It Is Finished
362 Activity To Access Next Used Group
364 Finger Finder Exit Point
400 Composition Container
402 Composition Line Container
404 Measure Container
406 Stroke Container
408 Note Container
410 Chord Container
500 Half Note Playing At Same Time As Four Eighth Notes
502 Quarter Note Playing At Same Time As Two Eighth Notes
504 Six Eighth Notes In Succession
506 Eighth Note Duration Chord
508 Eighth Note Duration Chord
510 Eighth Note Duration Chord
512 Eighth Note Duration Chord
514 Eighth Note Duration Chord
516 Eighth Note Duration Chord
518 Half Note
520 Quarter Rest Note Giving Half Note Solo Duration
522 Quarter Note
524 Quarter Note
526 Quarter Note Duration Chord
600 Graphical Output Of Example Program Using Finger Finder Routine For Guitar
602 Window Containing Composition
604 Selected Stroke
606 Window Containing Fingering Of Selected Stroke
608 Row Of Fret Numbers
610 Column Of String Numbers
612 Finger Number In Circle

DETAILED DESCRIPTION OF THE INVENTION

From the beginning of notated music, musicians have been composing music for other musicians to learn and perform. In classical staff notation, many composers add, or have added, the symbols required to explain to an instrumentalist and/or musician the actual fingering to be used when performing the musical score on a particular instrument. The symbols are generally specific to a type or class of instruments and designate which finger or hand should be placed where on the instrument to play specific notes to accomplish the performance of the musical piece. That is called symbolic fingering notation. It is extremely important to the overall musical sound that the musical staff notation for each instrument have the proper symbolic fingering notation to maximize the efficiency of playing and control of time and sound (i.e., it is a way for the composer and virtuoso performer to tell a musician where to put his fingers and/or hands). If fingering is added to a score, it is by this manual method and not automatically generated.

Although most string instruments also use some kind of tablature, in addition to or instead of standard musical notation, to determine the string length or pitch to be expressed, such tablature does not inform the performer how to play the piece efficiently, as tablature only depicts the string length for one note, on a note-by-note basis, and not the proper fingering required to perform all notes of a musical composition in sequential order, i.e., tablature does not provide fingering that takes into account the hand and finger position needed to play one note in relation to the hand and/or fingering for the note that preceded that note and for the note that follows that note.

The "Method of Automated Musical Instrument Finger Finding" is designed to automatically analyze musical data, which includes but is not limited to musical score and tablature data, and notate proper hand and/or fingering for a musical instrument for someone to enhance his ability to play the music in an efficient or otherwise desired manner. The following definitions are used herein to describe aspects of the inventions:

"Hand and/or fingering positioning information", "hand and fingering position information", "fingering", "finger finding" and variations thereof are used herein in a synonymous manner, and mean information that identifies which hand and/or which finger is placed at what position on the instrument to play a given note, chord or stroke. Thus, use herein of the term "fingering" is not limited to information that pertains only to fingering; depending on the context, "fingering" refers to finger placement, hand placement, or a combination of both. In the context of the instrument in question, it will be clear whether the information pertains to one or both hands, one or more fingers, or combinations thereof. For instance, hand and/or fingering positioning information for playing a note on a guitar may depict the string and fret onto which a specific finger of the left hand (or right hand for a musician that plays left-handed) is placed in order to play that note. Fingering information for a percussion instrument, such as a snare drum, may indicate which hand is used to beat which drum in the drum set. Fingering for a brass instrument, such as the trombone, may indicate the preferred hand movement to achieve a given slide position. Hand and/or finger positioning information for a keyboard instrument may indicate which finger(s) of the left hand is/are to be placed on which key(s), and which finger(s) of the right hand is/are to be placed on which key(s) to play a given note or sequential string of notes; and so on. It is understood that in the context of robotics or other technologies that can be designed to "play" a musical composition, the terms hands, fingers, fingering, and the like are understood to mean those elements of a robotic system that serve the function of hands and fingers.

"Performance-ready fingering" and variations thereof refers to hand and/or fingering information that instructs a musician how to perform each note in a musical composition in the manner desired by the musician, without having to "look up" hand and/or fingering information each time before playing one or more notes.

"Stroke", as used herein, is a musical note or chord.

Figure 2:
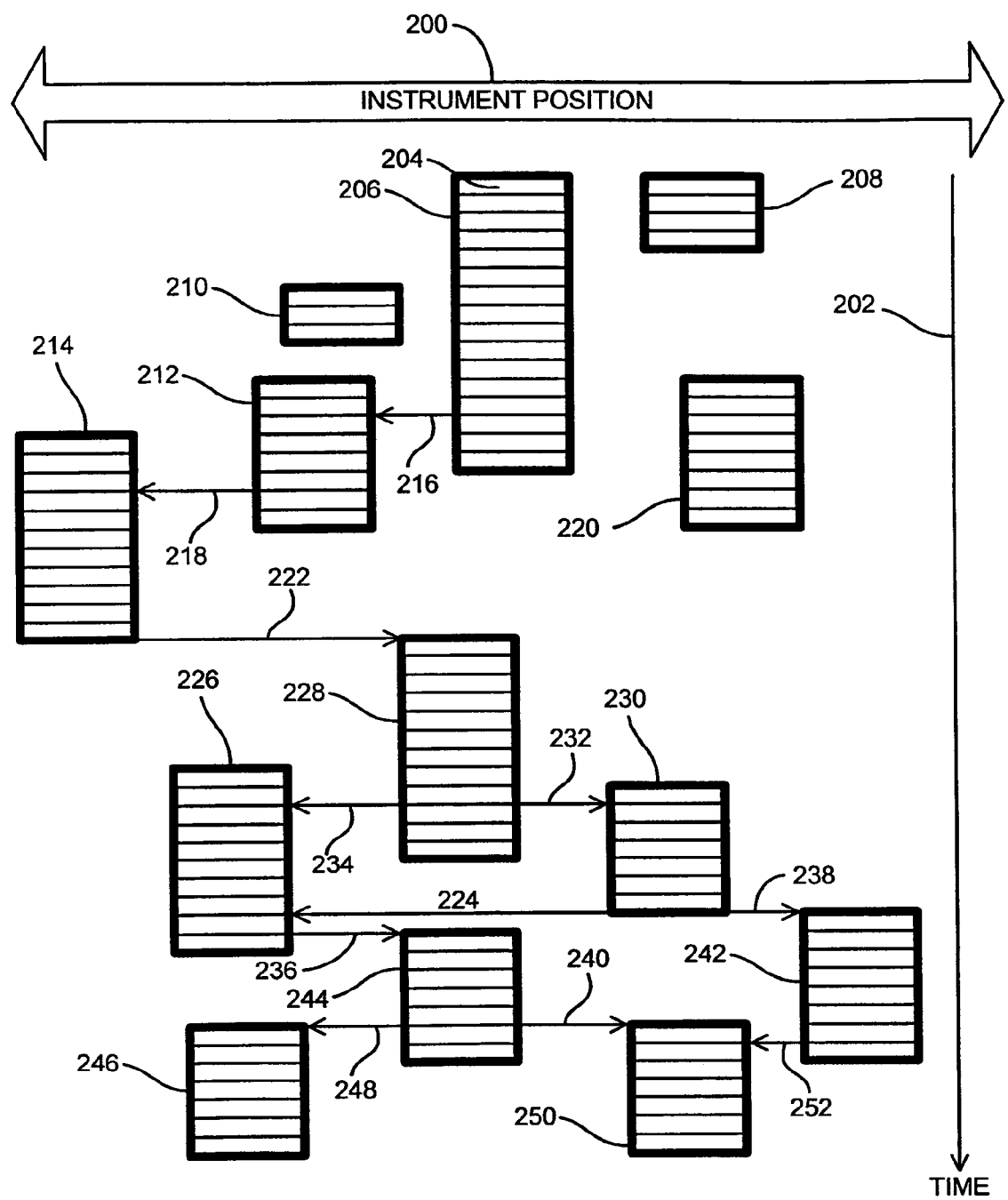
FIG. 2 illustrates the operational characteristics of the Finger Finder invention.

A "stroke group" comprises sequential strokes of a musical composition that can be played at one positional location on a given musical instrument. That is, a musician can play all the strokes in a single stroke group without having to move his hand to a different position on that instrument. If finger and hand placements differ on two different instruments, then it is likely that the stroke groups defined for the two instruments will also differ. For instance, for a single musical composition, the stroke groups defined for performing that composition on an electric guitar will likely be different that the stroke groups defined for performing the composition on a piano. It follows that, stroke groups defined for similar instruments, e.g., an electric guitar and acoustic guitar, may be very similar or identical to each other. FIG. 2 displays various stroke groups, e.g., 206, 208, 210, etc. All individual strokes, e.g., 204, within a stroke group can be played at the same position on a given instrument. However, because a stroke can generally be played at more than one positional location on an instrument, a single stroke can be a member of more than one stroke group. For instance, stroke 204 is a member of both stroke group 206 and stroke group 208 because stroke 204 can be played at two different positions on the instrument, i.e., the position identified by stroke group 206 and the position identified by stroke group 208.

"Secondary manner" and "alternate manner" are synonymous and refer to an optional manner in which a musician may desire or select to perform a musical composition, such as a manner of performing that is related to a desired tone, speed of performance, ease or difficulty of performance. A secondary manner of performing a musical composition also comprises optional techniques for performing a musical composition, such as using natural or artificial harmonics, slurs, bends, glissiando, hammers, pull offs, and other variations in playing technique that affect how a note is to be played. A user-selected secondary manner is a secondary or alternate manner of performing a musical composition that is desired or selected by an individual, such as a musician, a teacher, a published, a composer, and the like.

"Secondary fingering" and "alternate fingering" are synonymous and mean hand and/or finger positional information that instructs a musician how to play a musical composition in the desired secondary or alternate manner.

"Optimal manner" refers to a manner of performing a musical composition that requires the least hand movement on the instrument from the musician. Thus, the optimal manner of performing a musical composition is the most movement-efficient manner of performing the composition.

"Optimal fingering" is hand and/or finger positional information that instructs a musician how to play a musical composition in the optimal manner.

"Musical composition" refers to any two or more notes that are to be performed in sequential order. A musical composition can be a complete score, a partial score, one or more bars of musical notation, or any other two or more series of notes.

"Musical instrument" refers to any instrument for which it would be useful to have information regarding hand and/or finger placement on the instrument to perform a given note on that instrument. Examples of such musical instruments include, but are not limited to, stringed instruments, such as the banjo, guitar (including different types of guitar, e.g., classical, electric, 12-string, Spanish, etc.), bass (double and electric, etc.), harp, lute, mandolin, viola, violin, violoncello; for woodwind instruments, such as the bassoon, clarinet, flute, oboe, saxophone (e.g., soprano, alto, tenor), trombone; brass instruments, such as the cornet, horn (e.g., French horn, German horn, bugle, etc.), trumpet, tuba; keyboard instruments, such as the accordion, organ, piano; and percussion instruments, such as the drum and xylophone.

"Computing system" refers to a programmable device or machine that automatically processes information.

In brief, the present invention is a computing system and method that, without any substantive user input other than selection of a musical composition and an instrument type, automatically converts the inputted musical composition into complete performance-ready hand and/or fingering information that allows a user to perform the entire musical composition in a desired manner, such as an efficient manner, that recognizes the positional relationship of one note to another note, in a sequential manner, on the instrument. One feature that distinguishes the present invention from prior instrument fingering devices and methods (e.g., a look-up table), is that hand and/or fingering information provided by the present invention is automatically determined by identifying, sorting and evaluating all notes for the entire musical composition and determining all possible locations on the instrument where each note, or "stroke", can be played (most strokes can be played at more than one position on the instrument). Thus, the resulting hand and/or fingering information is optimized for the entire performance, i.e., the selection of each fingering position is made "intelligently" to minimize hand and finger movements during performance (optimal fingering), or otherwise optimizing a musician's performance of the music on the instrument (secondary fingering). The end result, or output, is complete performance-ready fingering information that is specific for performing the composition on the instrument in question, in a manner (e.g., ease, movement-efficient, tonal, etc.) desired by the musician.

By way of non-limiting example, sheet music for a complete musical composition can be scanned into the computing system where it is digitized into digital musical data, and stored in a memory. In one embodiment, the processor first identifies all strokes in the complete composition and assembles those strokes into stroke groups specific for the instrument on which the musical composition is to be performed. The processor then selects which of these stroke groups are to be used to determine optimum or alternate fingering for the composition on that instrument. The selection is based on factors such as hand movement, i.e., selecting groups that allow the performer to transition from one stroke to the next with ease or with minimal movement, or learning stage of the performer, i.e., selecting groups that result in fingering that is more or less complex for a more or less advanced performer, respectively. Because the processor determines the performance ready fingering information automatically, without any substantive input from the user (e.g., without the user providing the computing system with any information about the notes other than the input composition), the user need not have any musical training or understanding in order to use the computing system or method.

As opposed to tablature data, which provides information for playing only one note without regard to the note played before and/or the note that comes after, i.e., without regard to the sequential manner in which notes in a musical composition are played, the output from the present invention is hand and/or fingering information that provides an efficient way in which to play the notes of the input composition because it reflects the positional relationship on the instrument between sequential strokes.

For most instruments, a single note can be played at multiple positions on the instrument. For instance, with the trombone, a note may be played at two or more slide positions, often with one position easier than another; similarly, a note may be easier to play on a stringed instrument, such as the violin, if the fingers and hands are placed at one position versus another. By far, most musical scores using both standard staff notation and/or tablature will provide only one way to play the piece, which probably will not provide fingering for the musician's maximum performance. Even if the provided information is optimized for maximum performance, the musician might want one or more fingering options of the score or portions of it such that he can perform it in another manner, e.g., a secondary or alternate manner. This invention analyzes music data (e.g., staff notation and/or tablature) for an instrument and provides the musician with the best possible fingering by predetermining what fingering to use for the instrument from the musical data. Range of notes, for example, could be a determining factor in the fingering. Other important factors could be tone, speed of performance, and the ability to play relaxed or natural to the physical limitations of one's skill level. The invention also can provide hand and/or fingering information for different playing techniques, such as playing with natural or artificial harmonics, slurs, bends, glissiando, hammers, pull offs, and other variations for how a note is to be played. Consequently, this invention also generates intelligent secondary options for the selection of fingering.

As described more completely in the following pages, one embodiment of the present invention provides hand and/or fingering information for performing a musical composition on a musical instrument, wherein the hand and/or fingering information is based on the sequential order in which all strokes (e.g., notes or chords) of the composition are to be played and, in one embodiment, the shortest path between hand and/or fingering movements the musician needs to make in order to play the strokes in sequential order. The present computing system and method identify all the notes or chords ("strokes") of the input musical composition, and then identify locations on the instrument where sequential strokes of the musical composition can be played at the same positional location. Each collection of sequential strokes that can be played at the same positional location on the instrument is a "stroke group" (see FIG. 2 for a picture of sequential strokes assigned to stroke groups). The computing system automatically evaluates the identified stroke groups and, for each stroke, selects a stroke group to be used to determine the hand and/or fingering information for that stroke. The selection of each stroke group is, in one embodiment, based on the shortest path of hand and/or fingering movement that a musician needs to make to play sequential strokes. In other embodiments, the selection of each stroke group is based on a desired secondary factor or manner, such as speed, difficulty, tonal qualities, or the like. Significantly, the stroke group selected for use in determining the hand and/or fingering for one stroke takes into account the stroke group that was selected for use in determining the hand and/or fingering for the previous stroke and, likewise, will be relevant for the selection of the stroke group corresponding to the stroke that follows. This selection process meets the objective of identifying efficient hand and/or fingering positioning information for performing the entire musical composition that is input into the system. Accordingly, the output from the computing system provides a musician with hand and/or fingering positioning information for performance of the musical composition on at least one instrument of choice, in the manner (optimal or secondary) of the musician's choice.

This invention is useful for composers, for teachers explaining to their students the best way to play a musical composition, by music publishers allowing them to scan musical scores and have a "performance ready" printout of the music to sell for a variety of instruments, and by the performer who could now take any music available within the range of his instrument and use this invention to come up with a professionally correct fingering for the performance. The invention will find many additional users, as well. This would be a tremendous time and labor saver.

The present invention can provide hand and/or fingering information for any instrument for which a musician (whether novice or expert) finds it useful to have information regarding hand and/or finger placement on the instrument that corresponds to a note to be played. Thus, by way of non-limiting example, the invention is useful for stringed instruments, such as the banjo, guitar (including different types of guitar, eg., classical, electric, 12-string, Spanish, etc.), bass (double and electric, etc.), harp, lute, mandolin, viola, violin, violoncello; for woodwind instruments, such as the bassoon, clarinet, flute, oboe, saxophone (e.g., soprano, alto, tenor), trombone; brass instruments, such as the cornet, horn (e.g., French horn, German horn, bugle, etc.), trumpet, tuba; keyboard instruments, such as the accordion, organ, piano; and percussion instruments, such as the drum and xylophone. The foregoing list is provided for exemplary purposes only and is not exhaustive.

The musical composition that is input into the computing system can be in a variety of states, such as paper (onto which a score or musical notes are printed), digital information, sound, and other mediums, all of which are input into the computing system by an input means, including those set forth in FIG. 1.

The hand and/or fingering information that is output from the computing system can be in a variety of forms. For instance, the hand and/or fingering information can be displayed along with the musical notation, such as a paper printout of sheet music with hand and/or fingering information for a certain instrument displayed on the sheet music. Alternatively, the hand and/or fingering information can be displayed by itself, without musical notation. In some embodiments, it may be desired to provide hand and/or fingering information for more than one instrument, or for more than one manner of playing a musical composition on the same instrument, on the same output display, such as paper, on a screen, to another computer, etc. FIG. 1 displays various output means that can be employed with the present invention.

An exemplary software program for use to determine optimal hand and/or fingering information for the guitar for use with the present invention is Finger Finder Library For Guitar, copyright Feb. 4, 2002. Similar programs and variations thereof consistent with the present invention and applicable to a variety of different instruments (string, keyboard, brass, percussion, wind, etc.) are contemplated. The present method and computing system can be variously configured to provide hand and/or fingering information for only one, several, or multiple instruments. If configured to provide hand and/or fingering information for more than one instrument, then they can similarly be configured to output hand and/or fingering information for multiple instruments at the same time. Those of skill in the computing and software arts will understand how to implement programming and system development to achieve the desired objective. For instance, a publisher may desire a method and computing system that will output hand and/or fingering information useful for playing a musical composition on more than one type of instrument. Such a method and system could be a based on a single computing system having the capability to process a musical composition to provide multiple hand and/or fingering information sets, or it could be a single computing system with the capability of accepting one or more instrument-specific programs to provide instrument-specific hand and/or fingering information, or any of many other configurations. A user may desire a method and/or a computing system that outputs hand and/or fingering information only for the instrument played by that individual user. The invented method and computing system also finds applications in the robotics field. In such a case, the output will be hand and/or fingering information that is adapted for use by a robotic device to perform a musical composition. As will be clear to those of skill in this art, the present method and computing system is subject to numerous configurations that are consistent with the invention.

Several objects and advantages of the present invention are: to decrease the costs and decrease the time-to-market of publishers getting music published with professional fingering information; enhance performance and publication of music originally composed for one instrument to be easily performed on other instruments; enhance sale of publication of music by making the music more easily playable; music composition software would be enhanced and more attractive to customers with the addition of the finger finding feature of this invention; enhance composers' ability to compose by giving them knowledge on the ease of playability of their composition on an instrument; to enhance the ability of the performer with secondary options of fingering on their instrument; enhance teaching abilities by teaching students how to play instruments on which the teacher is less skilled.

Further objects and advantages of the present invention will become apparent from a consideration of the drawings and ensuing description.

FIG. 1 shows an exemplary computing system for use in conjunction with an embodiment of the Finger Finder invention. Here, the Finger Finder invention is executing on 100, with its input (a musical composition for an instrument) coming from some kind of input device, like:

A tablet 102 where a user would enter a composition onto the tablet with a pen type of device.
A scanner 104 that a user would use to scan in sheet music.
A mouse 106 likely used in combination with a keyboard 108 that a user would use to enter a composition.
A microphone 110 that a user would play a musical instrument into to digitize and automatically notate the played composition.
A MIDI device 112, like a common kind of electronic keyboard, a user could connect directly to their computer and play and automatically notate the played composition.
A data storage device 114 where a previously stored composition could reside.
A computer network (a LAN or a WAN, like the Internet) 120 where the composition could come from a remote machine.

The output of the Finger Finder invention could be:
Sent to a MIDI device 112 that can make use of the data.
Placed on a data storage device 114 for later retrieval or electronic publishing purposes.
Shown on a monitor 116 for viewing in a teaching or composition creation environment.
Printed to a plotter or printer 118 for paper publishing purposes.
Sent across a computer network 120 for remote analysis, paper or electronic publishing, or data storage or sharing purposes.

This invention automates the determination of instrument finger finding by the method of gathering and analyzing stroke groups. FIG. 2 illustrates this. This Figure is a plot of physical instrument position 200 in the horizontal dimension versus time 202 in the vertical dimension (time increasing going down; i.e., the sequential order of stroke performance is displayed by moving down the vertical dimension, with the first note to be performed at the top of the time axis, and the last note to be performed displayed at the bottom of the time axis). Thin individual boxes, like box 204, represent the strokes. A group of sequential strokes is surrounded by a thicker box, like box 206, to define a stroke group. The horizontal dimension of a stroke group box represents the positional range on the instrument at which that group of strokes can be played; that is, the hand on the instrument can play all the strokes in the stroke group in one place on the instrument. Note that some strokes (notes and chords) can be played at more than one position on the instrument, e.g., stroke 204 can be played at the position defined by stroke group 206 and at the position defined by stroke group 208; similarly, the first stroke in stroke group 214 can be played in stroke groups 214, 212, 206, and 220.

For the example shown in FIG. 2, the first several strokes can be played either at the positional ranges within group 206 or group 208. Afterwards, the next couple of strokes in sequential order can only be played within group 206. For fingering determination based on efficient hand movement, group 206 would be compared to group 208 to determine which stroke group should be used to provide fingering for the first four strokes. In this case, group 208 would be discarded in favor of playing the first several strokes all within group 206, as no hand movement is required to play the first six strokes in the musical composition. However, an embodiment of this program that favors a secondary manner may give the user an option to play all or some of the first four strokes in the musical composition within group 208 instead of group 206, if such fingering would lead to the desired secondary preference, e.g., easier fingering of the instrument or preferable tonal qualifies of the instrument at this position over the position of group 206. This preference may be based on user selection, or based on a setting within the program giving preference to one or more locations.

Likewise, there are some strokes after the first several that can be played either in group 206 or in group 210, followed by strokes only being able to be played in group 206. Again, for efficient hand movement, group 206 would be preferred, unless overridden by a user preference for other locations based on other criteria.

At a time later in the sequential order of strokes within a musical composition, there is a set of strokes that can either be played within group 206, 212, or 220, followed by a set of strokes that can be played within group 206, 212, 220, or 214, followed by a set of strokes that only be played within group 214. Unless overridden by user preferences to the contrary, the finger finder invention would choose the strokes to be played within group 206, transitioning to group 212 (via transition 216) at a musical key boundary, and then transitioning to group 214 (via transition 218) at a musical key boundary. A "musical key boundary" is a sequence of strokes (determined by the musical composition) that positions ease of fingering to the next best choice of fingering; in other words, the fingering for the sequential notes in a musical key boundary places the hand in a better position to play the upcoming notes in the musical composition. (By way of a single, non-limiting example, a musical key boundary could be marked, for example, as a C note in the key of C.) In this manner, there are at least two transitions from group 206 to group 214, each transition giving the minimal hand movement across the instrument. Another user preference, however, may be to minimize the number of hand transitions, and so all the strokes would be played within group 206 followed by a direct transition to group 214 where the strokes within that group would be played until a transition to another group would be required.

The determination of going from group 206 to group 212 to group 214 was based on the fact that there were strokes that could only be played in group 214, that group 206 had to be the starting point for performance of the musical composition since starting at group 208 would have required an undesirable hand transition to group 206, that going to group 210 was undesirable, as another transition back to group 206 would have been needed, and that going to group 212 was desirable as that provided an intermediate minimal hand transition.

A second set of circumstances is shown following the strokes played within group 214 and transitioning to group 228 via transition 222. At this point, there are multiple places to play the rest of the strokes. In this case, group determination is done by determining the minimal total path distance; that is, the total hand movement not just from one group to another, but taking into account all of the combinations of group traversal until the last stroke.

For example, from group 228, either group 226 or 230 would have to be transitioned to as there is a set of strokes that can only be played in group 226 or 230. From group 226 a transition to group 244 is required, and from group 230 a transition to group 242 or 226 would be required. From group 244 a transition to group 246 or group 250 would be required, and from group 242 a transition to group 250 would be required. The actual group transition sequence, without user preference overrides, would be determined by the minimum of the following transitions:

(i) Transition 234+transition 236+transition 248
(ii) Transition 234+transition 236+transition 240
(iii) Transition 232+transition 238+transition 252
(iv) Transition 232+transition 224+transition 236+transition 248
(v) Transition 232+transition 224+transition 236+transition 240

In the case of multiple paths having the same minimal total distance, the Finger Finder invention would prefer the path with the most right or left, or top or bottom, as appropriate for the instrument under consideration, number of groups.

Figure 3A:
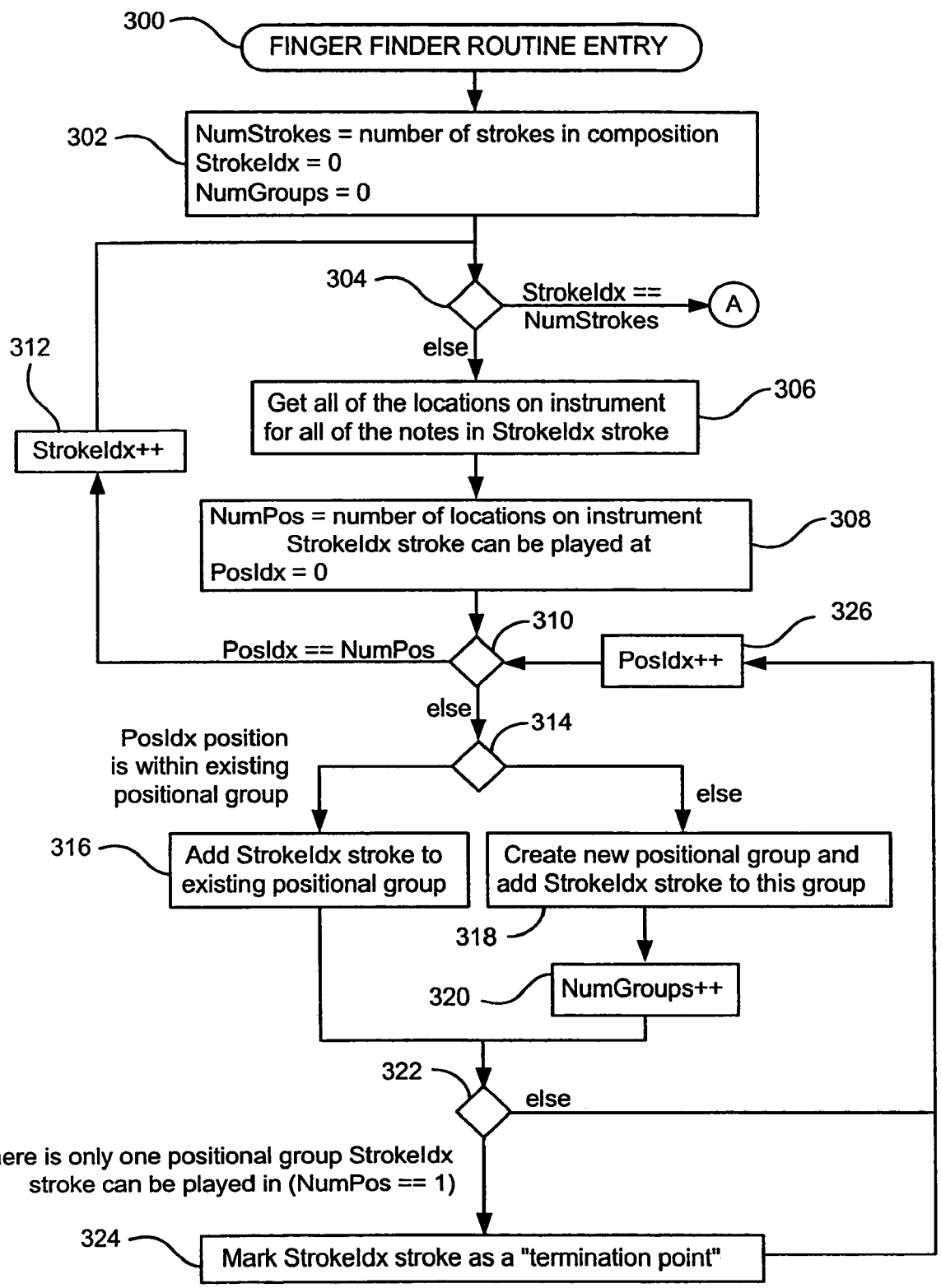
FIG. 3A is a flowchart showing the activities performed by the Finger Finder invention that are required for determining all of the strokes, the groups and the strokes associated with the groups.
Figure 3B:
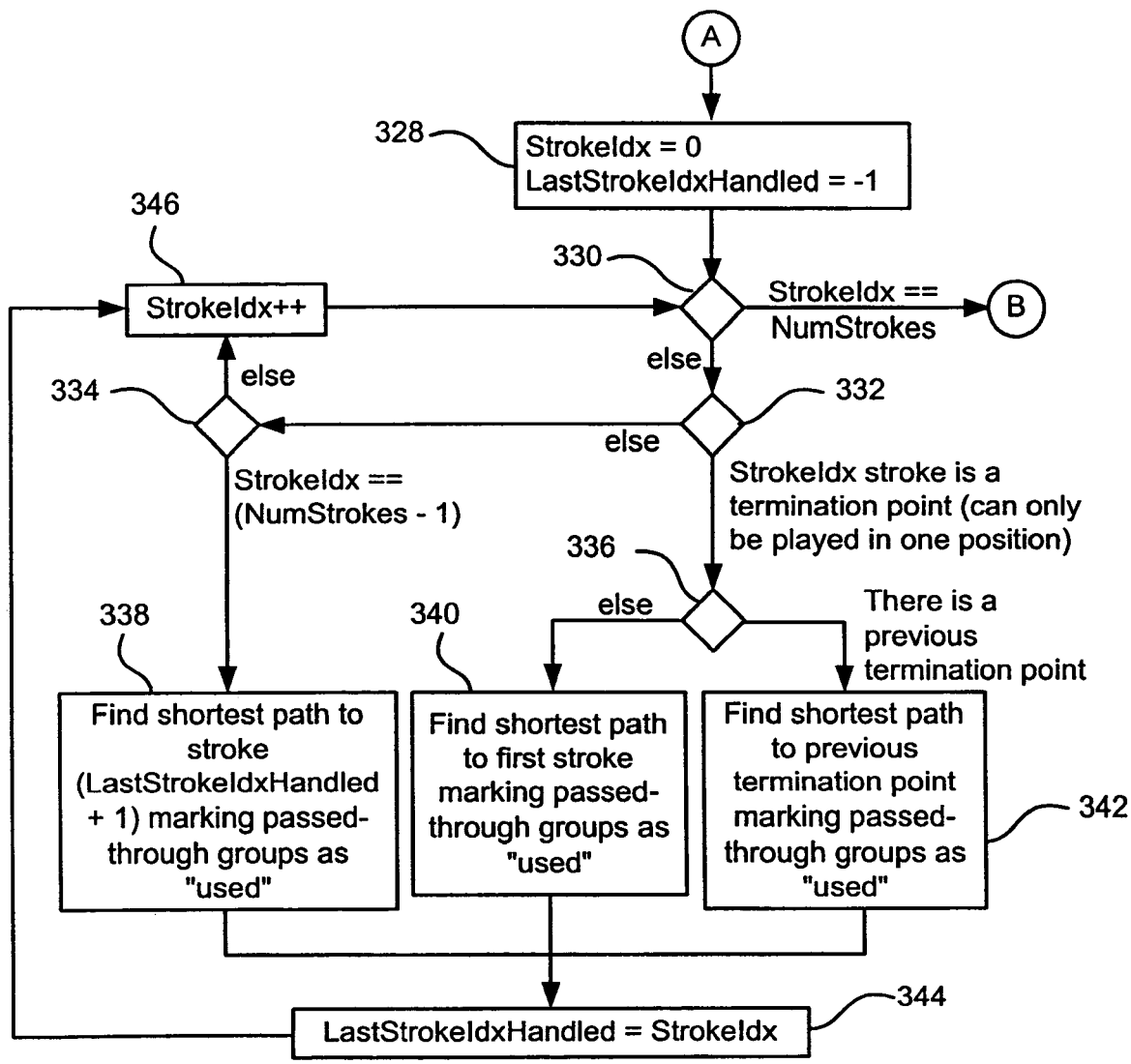
FIG. 3B is a flow chart showing the activities performed by the Finger Finder invention that are required for determining which groups are to be used for Finger Finding purposes.
Figure 3C:
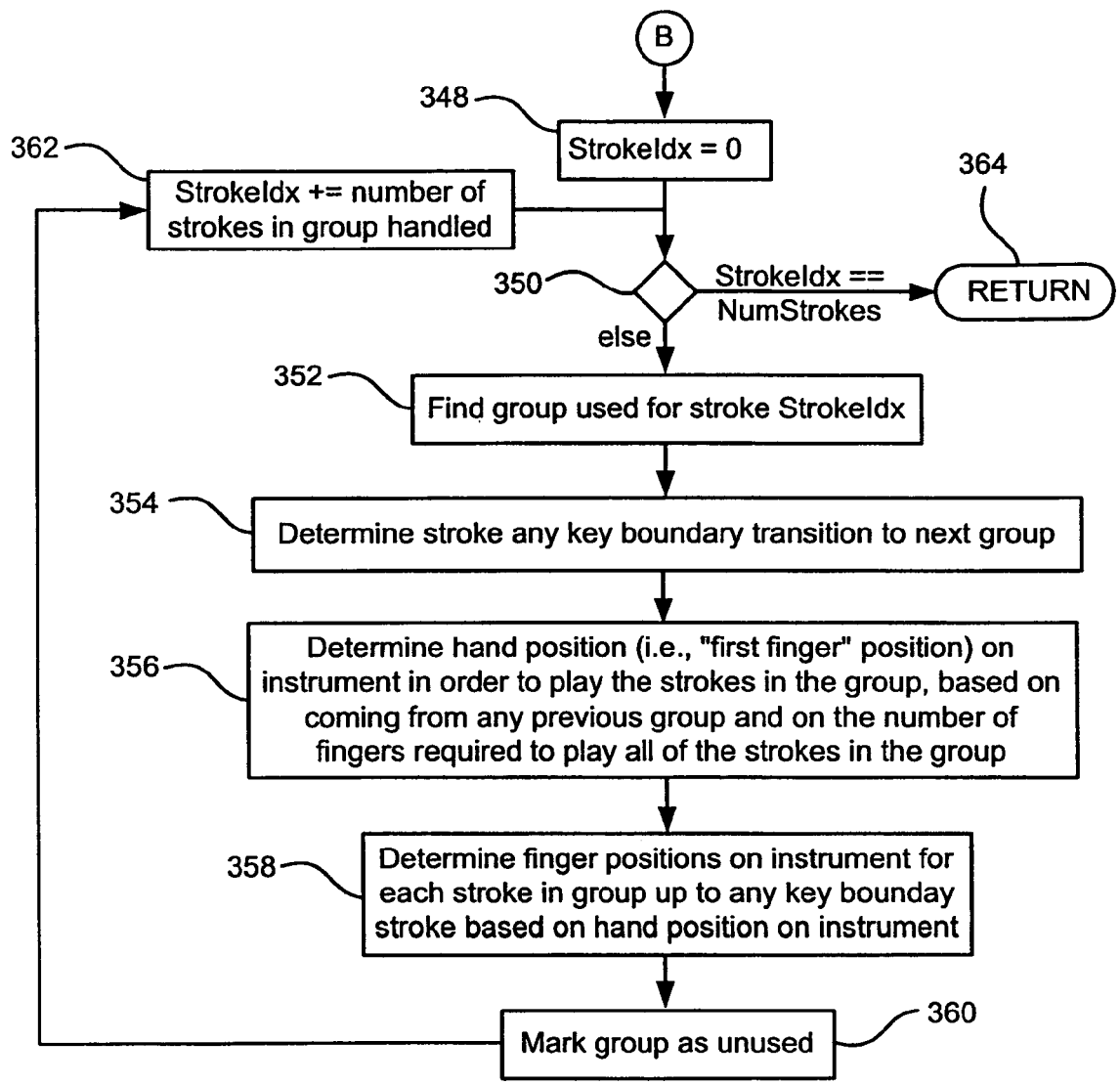
FIG. 3C is a flowchart showing the activities performed by the Finger Finder invention that are required for determining the actual hand and/or fingering positions on the instrument.

FIG. 3 is a flowchart illustrating the activities performed by the Finger Finder invention, according to an exemplary embodiment of the invention. FIG. 3A shows the activities required for determining all of the strokes, the groups and the strokes associated with the groups. FIG. 3B shows the activities required for determining which groups are to be used for Finger Finding purposes. FIG. 3C shows the activities required for determining the actual hand and/or fingering positions on the instrument.

Figure 4:
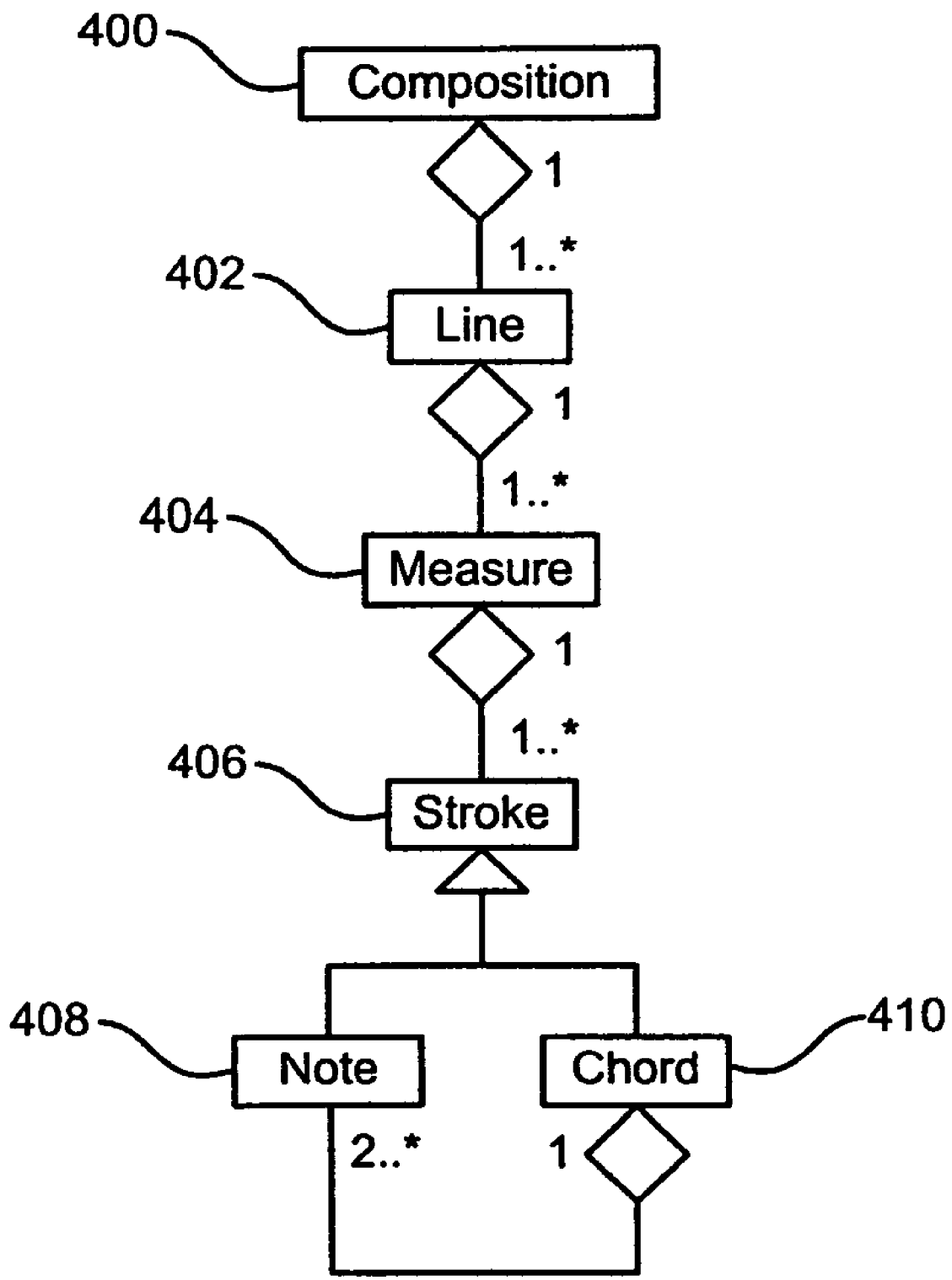
FIG. 4 illustrates an exemplary composition input for an exemplary embodiment of the Finger Finder invention.

Step 300 is the entry in to the Finger Finder invention. The data input to the Finger Finder invention is the musical composition data for a musical instrument, as illustrated by FIG. 4.

Step 302 is the initialization activities of the Finger Finder invention. Activity variables are shown in this block that are used to qualify other activities later on. Activity variable NumStrokes represents the total number of strokes in the composition; this number is the actual number of fingering positions, where any repeated sequences in the composition are taken into account and duplicated and placed in the input stream. Activity variable StrokeIdx represents an index into the strokes, where index value 0 accesses the first stroke of the composition, and an index value of (NumStrokes−1) accesses the last stroke of the composition. Activity variable NumGroups represents the total number of positional range stroke groups that this flowchart creates.

Activity 304 is a decision point. If all of the strokes in a composition have been handled (by creating positional range groups and assigning the strokes to these groups), then the Finger Finder invention next determines which groups are to be used for Finger Finding purposes, starting with activity 328.

Activity 306 is the retrieving of all of the positional ranges on the instrument at which the stroke under consideration can be played. Activity 308 is the initialization activities required to access the different positional ranges of the stroke.

Activity 310 is a decision point. If all of the positional ranges of the current stroke have been handled, then activity 312 is branched to; otherwise, activity 314 is branched to.

Activity 312 is the activity required to access the next stroke.

Activity 314 is a decision point. If a positional range stroke group already exists at the current time (meaning that the previous stroke and the current stroke share a common stroke group), then activity 316 is performed; otherwise, activity 318 is performed.

Activity 316 associates the current stroke to an existing positional range stroke group. Activity 318 creates a new positional range stroke group and associates the current stroke to this new group. Activity 320 increments by one the count of the total number of groups, to be used later.

Activity 322 is a decision point. If there is only one positional range group in which the current stroke can be played, then activity 324 is performed, in which the stroke is marked as a "termination point" (i.e., a stroke that can only be played in one group). After activity 324 or if the stroke can be played within multiple groups upon arriving at activity 322, activity 326 is performed, which is done in order to access the current stroke's next positional range group.

Activity 328 is the initialization activities required to determine which groups are used for the purposes of finger finding. As before, StrokeIdx is the variable used to access the strokes in the composition. Activity variable LastStrokeIdxHandled represents the index into the strokes that was last handled by the activities of FIG. 3B.

Activity 330 is a decision point, where if all of the groups have been found, then the flowchart starts the activities of determining the actual fingering, starting with activity 348. If all the groups have not yet been handled, then activity 332 is gone to.

If a stroke under consideration can only be played within one positional range group (the stroke is a "termination point"), activity 332 branches to activity 336, and if there was a previous termination point, then activity 336 branches to activity 342 where the shortest path to the previous termination point is found, as described for FIG. 2, where the groups that are used are marked as such for later. If there was no previous termination point, then activity 336 branches to activity 340 where the shortest path to the first stroke in the composition is found, as described for FIG. 2, where the groups that are used are marked as such for later.

If the current stroke is not a termination point, then activity 332 branches to activity 334, where if the current stroke is the last stroke in the composition, then activity 334 branches to activity 338 where the shortest path to the previously handled last stroke is found (which may be the first stroke of the composition if there are no termination points), as described for FIG. 2, where the groups that are used are marked as such for later.

After activity 338, 340, or 342 is performed, activity variable LastStrokeIdxHandled is set to the current stroke index in order to find the shortest path from a later stroke to this stroke (if this is not already the last stroke).

If the current stroke is not the last stroke of the composition in activity 334 or after activity 344 is performed, activity 346 is performed, which is the activity required to access the next stroke in the composition.

Activity 348 is the initialization activity required to find the actual fingering of the instrument for the strokes in the composition, which then branches to activity 350. If all the strokes have been handled, then activity 350 exits the Finger Finder via 364; otherwise, activity 352 is entered.

Activity 352 finds the group used for the stroke under consideration then goes to activity 354 which goes through the group to find a stroke at or crossing a key boundary to the next used group. Activity 354 leads to activity 356 which determines the hand position on the instrument; this is based on the previous group from which the hand is coming, if any, and the number of fingers needed to play the strokes in the group. For example, if not all the fingers on the hand are needed to play the strokes, then the hand may be able to transition to the position in such a way as to minimize the transition distance (and therefore transition time), so that a stroke that would normally be played by one finger will actually be played by another.

Activity 356 leads to activity 358, where, based on the hand position on the instrument, the fingering positions on the instrument are determined for the strokes in the group up to but not including the key boundary stroke. After this, the group is listed as unused in activity 360 so the group that the next stroke is in can be found. Afterward, activity 362 is performed, which is required in order to access the first stroke in the next group.

FIG. 4 is a diagram illustrating an exemplary musical composition input for an exemplary embodiment of the Finger Finder invention, as would be fed as the input to the Finger Finder invention of FIG. 3 activity 300. This Figure shows how a composition for a musical instrument can be implemented as a composition container (e.g., a C data structure or a C++ or Java class) 400 being composed of a 1 or more composition line containers 402, which are themselves composed of one or more measure containers 404, which are themselves composed of one or more stroke containers 406. This Figure also shows that a note container 408 and a chord container 410 are subtypes of the stroke container 406, and that a chord container 410 is composed of two or more note containers 408.

Different variations of this could be implemented as input to the Finger Finder invention. The above scheme works fine if the key of the composition is maintained with the line object 402, where different lines could be in different keys. The key could alternately be maintained in the measure container 404, which could then remove the need for a line container 402.

The measure container 404 is handy for containing information about such measure related information as the beginning measure and the end measure of a repeated sequence, so that the Finger Finder invention can find strokes that aren't necessarily next to each other as written on sheet music. Alternately, the software that instructs the processor for the Finger Finder invention could create a data structure such that all the notes are linearly accessed by the Finger Finder invention (e.g., the strokes in a repeated sequence are duplicated and put in the data structure where appropriate) and have the key that the composition is currently in maintained with the stroke container, so that the measure container 404 and the composition line container 402 would not be needed; this is the configuration assumed by FIG. 3, but the other arrangements are considered by this invention as well.

Figure 5A:
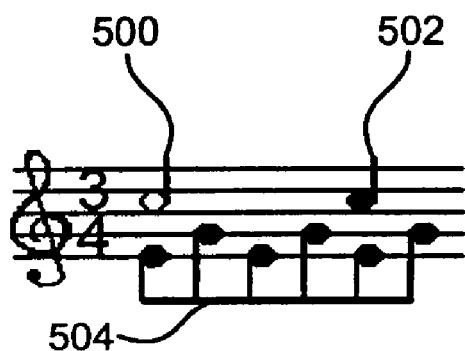
FIG. 5A illustrates one of the options for composition input for an exemplary embodiment of the Finger Finder invention, wherein there occur, at the same time, multiple strokes of different durations.
Figure 5B:
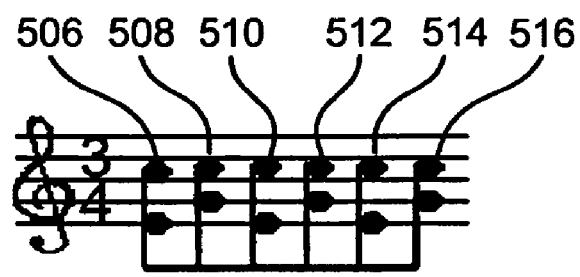
FIG. 5B illustrates an alternative manner in which the Finger Finder invention may internally represent the composition of FIG. 5A.

Another option for the input involves the stroke container 406 when there occurs, at the same time, multiple strokes of different durations, as shown in FIG. 5A. In FIG. 5A, stroke 500, a half note, is struck and held until four of the eighth notes of 504 are played, and then stroke 502, a quarter note, is struck and held while the remaining two eighth notes of 504 are played. Since the timing of the composition is not a factor in determining the fingering of an instrument for this invention, the program creating the input for the Finger Finder invention may internally represent the composition of FIG. 5A as shown in FIG. 5B. In FIG. 5B, half note 500 is broken into four eighth notes, 506, 508, 510, and 512, and combined with four of the eighth notes of 504, thus creating four eighth note chords; for this representation, the internal data content for notes 508, 510, and 512 would have to include information that these notes are not to be played (struck) again, but they exist only for finding the correct fingering of the instrument. Likewise, quarter note 502 is broken into two eighth notes, 514 and 516, and combined with the last two eighth notes of 504, thus creating two eighth note chords; again, the internal data content for note 516 would have to include information that this note is not to be played (struck) again, but it exists only for finding the correct fingering of the instrument.

Figure 5C:
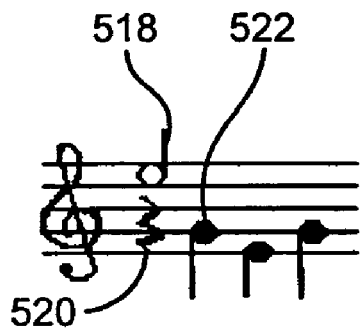
FIG. 5C illustrates another option for composition input for an exemplary embodiment of the Finger Finder invention, which is similar to that in FIG. 5A in that there occur multiple strokes of different durations.
Figure 5D:
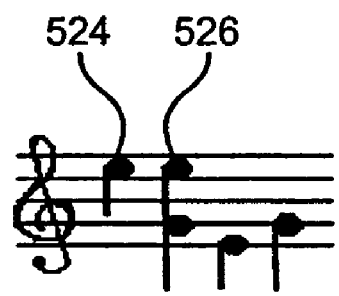
FIG. 5D illustrates an alternate manner in which the Finger Finder invention may internally represent the composition of FIG. 5C.

FIG. 5C shows a very similar construction as FIG. 5A. In FIG. 5C, a half note 518 is paired with a quarter rest 520, meaning that stroke 518 is played for a quarter time, then continued to be held for the duration of the next quarter note 522. As in the preceding paragraph, for finger finding purposes this could be refactored as shown in FIG. 5D, where half note 518 is broken into two quarter notes 524 and 526. Notice that note 526 is now combined with note 522 to make a chord. As above, the internal data representation of note 526 would have to indicate that it is not actually played, it is there only for finding the correct fingering of the instrument.

The output of the Finger Finder invention contains information on the hand placement and fingering for the instrument; e.g., the number of hand positions in the output data, followed by an array of hand positions containing information such as an indication of which hand is being described (differentiating between the right hand and the left hand, as appropriate), and information denoting which finger is where on the instrument. For example, for a string instrument, like a guitar, this information would indicate which finger of the left hand is on which string and at which fret; for a keyboard instrument, like a piano, or a wind instrument, like a clarinet, this information would indicate which hand and which finger is pressing which key. For an implementation of this invention, an indication of which stroke in the composition the fingering data refers may also be desired for graphical user interface purposes.

Figure 6:
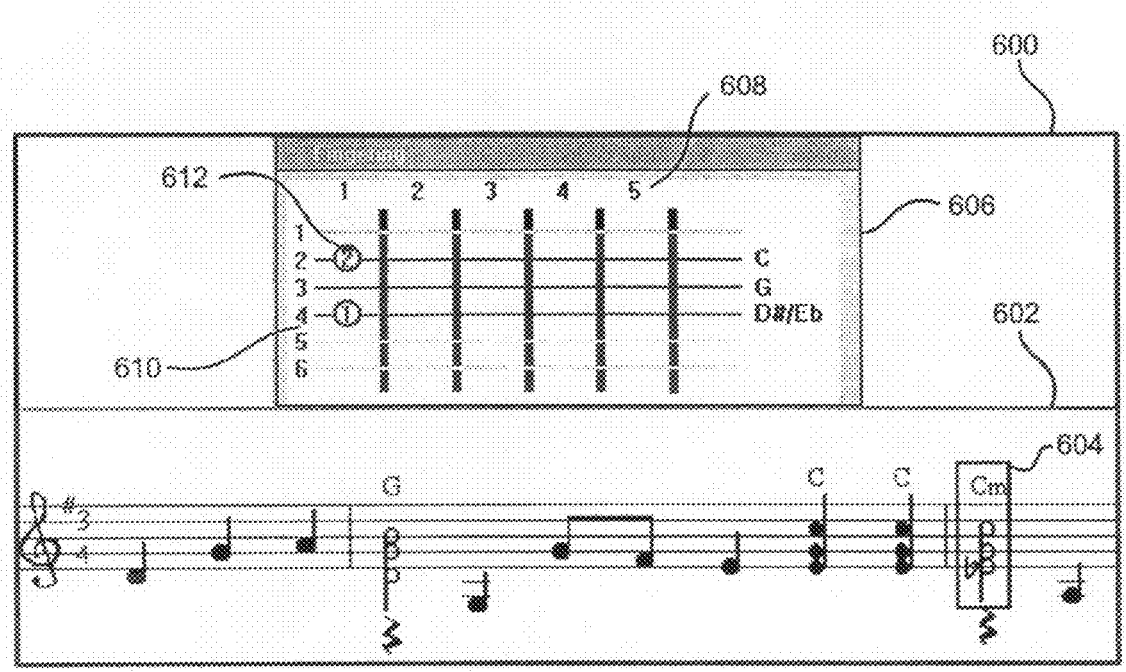
FIG. 6 illustrates an exemplary embodiment of the Finger Finder invention where the complete fingering of a guitar composition is shown by the embodiment.

FIG. 6 illustrates an exemplary embodiment of the Finger Finder invention where the complete fingering of a musical composition for performance on the guitar is shown by the embodiment.

In FIG. 6, item 600 is the frame window of an application containing subwindows 602 and 606. Item 602 is a window containing a musical score for a guitar comprised of single strokes and chords. Item 604 is the selected stroke of the composition whose complete fingering is shown in window 606. The graphics shown in window 606 is comprised of a row of guitar fret numbers 608, a column of string numbers 610, and encircled finger numbers 612 (1 for the index finger, 2 for the middle finger, 3 for the ring finger, and 4 for the little finger, all for the left hand); thus, the complete left hand fingering on a guitar is shown on how to play stroke 604. It should be noted that for this invention, if the same stroke appears again in the same composition or another composition, its fingering may be completely different depending on the other strokes around the stroke.

What is claimed is:

1. A computing system for automatically determining hand and/or fingering positioning information for performing a musical composition by a robotic device on at least one musical instrument, comprising:
   a. a memory,
   b. an input device for inputting the musical composition into the computing system,
   c. a processor for automatically (i) identifying all strokes and stroke groups in the input musical composition, wherein a stroke is a note or a chord, and wherein a stroke group for each instrument comprises sequential strokes of the musical composition that can be played at one positional location on that instrument, (ii) selecting a stroke group to be used to determine the hand and/or fingering information for each stroke to be performed on each instrument, and (iii) using the selected stroke groups to determine the hand and/or fingering positioning information for playing the strokes in the musical composition on each musical instrument, and
   d. an output device for outputting the hand and/or fingering positioning information for performance of the musical composition by a robotic device on at least one musical instrument, wherein the at least one musical instrument is selected from the group consisting of a stringed instrument, a woodwind instrument, a brass instrument, a keyboard instrument, and a percussion instrument.

2. The computing system according to claim 1, wherein the at least one musical instrument is selected from the group consisting of banjo, guitar, bass, harp, lute, mandolin, viola, violin, violoncello, bassoon, clarinet, flute, oboe, saxophone, trombone, cornet, horn, trumpet, tuba, accordion, organ, piano, drum and xylophone.

3. The computing system of claim 1, wherein the input device is selected from the group consisting of a data storage device containing digital musical data, a computer network from which digital musical data are obtained, a computer program, stored on a computer readable medium, where digital musical data are entered by a mouse, keyboard, or tablet, a MIDI device providing digital musical data, a digitizing scanner that scans paper containing the musical composition and a means of converting the digitized image into digital musical data, a microphone that captures musical sounds and a converter that converts the sounds into digital musical data.

4. The computing system of claim 1, wherein the output device is selected from the group consisting of a data storage device, a computer network, a printer, a computer monitor, and a robotic device that uses the hand and/or fingering information for a musical performance.

5. The computing system of claim 1, wherein the computing system comprises a device for digitizing a musical composition that is input in a non-digitized form.

6. The computing system of claim 1, wherein the hand and/or fingering positional information is provided for at least two different musical instruments.

7. A computing system for automatically determining hand and/or fingering positioning information for performing a musical composition by a robotic device on at least one musical instrument, comprising:
   a. a memory,
   b. an input device for inputting the musical composition into the computing system,
   c. a processor for automatically (i) identifying all strokes and stroke groups in the input musical composition, wherein a stroke is a note or a chord, and wherein a stroke group for an instrument comprises sequential strokes of the musical composition that can be played at one positional location on that instrument, (ii) selecting a stroke group to be used to determine the hand and/or fingering information for each stroke to be performed on each instrument, wherein each selection is consistent with a selected secondary manner of performing the musical composition, and (iii) using the selected stroke groups to determine the hand and/or fingering positioning information for playing the strokes in the musical composition on each musical instrument in the selected secondary manner, and
   d. an output device for outputting the hand and/or fingering positioning information for performance of the musical composition by a robotic device on the at least one musical instrument according to the selected secondary manner, wherein at least one musical instrument is selected from the group consisting of a stringed instrument, a woodwind instrument, a brass instrument, a keyboard instrument, and a percussion instrument.

8. The computing system of claim 7, wherein the at least one musical instrument is selected from the group consisting of banjo, guitar, bass, harp, lute, mandolin, viola, violin, violoncello, bassoon, clarinet, flute, oboe, saxophone, trombone, cornet, horn, trumpet, tuba, accordion, organ, piano, drum and xylophone.

9. The computing system of claim 7, wherein the selected secondary manner is selected from the group consisting of easier fingering, minimized hand movement, ease of performance, tonal quality, natural or artificial harmonics, and techniques that affect how a note is to be played.

10. The computing system of claim 7, wherein the input means is selected from the group consisting of a data storage device containing digital musical data, a computer network from which digital musical data are obtained, a computer program, stored on a computer readable medium, where digital musical data are entered by a mouse, keyboard, or tablet, a MIDI device providing digital musical data, a digitizing scanner that scans paper containing the musical composition and a means of converting the digitized image into digital musical data, a microphone that captures musical sounds and a converter that converts the sounds into digital musical data.

11. The computing system of claim 7, wherein the output means is selected from the group consisting of a data storage device, a computer network, a printer, a computer monitor, and a robotic device that uses the hand and/or fingering information for a musical performance.

12. A method for automatically determining hand and/or fingering positional information for performing a musical composition by a robotic device on at least one musical instrument, comprising:
- a. providing a computing system,
- b. inputting the musical composition into the computing system,
- c. using the computing system to automatically (i) identify all strokes and stroke groups in the input musical composition, wherein a stroke is a note or a chord, and wherein a stroke group for an instrument comprises sequential strokes of the musical composition that can be played at one positional location on that instrument, (ii) select a stroke group to be used to determine the hand and/or fingering information for each stroke to be performed on each instrument, and (iii) use the selected stroke groups to determine the hand and/or fingering positioning information for playing the strokes in the musical composition on each musical instrument, and
- d. outputting the hand and/or fingering positioning information for performance of the musical composition by a robotic device on the at least one musical instrument, wherein at least one musical instrument is selected from the group consisting of a stringed instrument, a woodwind instrument, a brass instrument, a keyboard instrument, and a percussion instrument.

13. The method of claim 12, wherein the at least one musical instrument is selected from the group consisting of banjo, guitar, bass, harp, lute, mandolin, viola, violin, violoncello, bassoon, clarinet, flute, oboe, saxophone, trombone, cornet, horn, trumpet, tuba, accordion, organ, piano, drum and xylophone.

14. The method of claim 12, wherein selection of a stroke group is consistent with a secondary manner of performing the musical composition and the secondary manner is selected from the group consisting of easier fingering, minimized hand movement, ease of performance, tonal quality, natural or artificial harmonics, and techniques that affect how a note is to be played.

15. The method of claim 12, wherein the input means is selected from the group consisting of a data storage device containing digital musical data, a computer network from which digital musical data are obtained, a computer program, stored on a computer readable medium, where digital musical data are entered by a mouse, keyboard, or tablet, a MIDI device providing digital musical data, a digitizing scanner that scans paper containing the musical composition and a means of converting the digitized image into digital musical data, a microphone that captures musical sounds and a converter that converts the sounds into digital musical data.

16. The method of claim 12, wherein the output means is selected from the group consisting of a data storage device, a computer network, a printer, a computer monitor, and a robotic device that uses the hand and/or fingering information for a musical performance.

\* \* \* \* \*